United States Patent
Pesce et al.

(10) Patent No.: US 8,463,844 B2
(45) Date of Patent: Jun. 11, 2013

(54) PORTLETS IN NON-PORTAL PAGES

(75) Inventors: Timmothy Pesce, Arvada, CO (US); Peter Laird, Superior, CO (US); Skip Sauls, Longmont, CO (US); Christopher Jolley, Lone Tree, CO (US); Subrahmanyam Allamaraju, San Ramon, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1020 days.

(21) Appl. No.: 12/114,648

(22) Filed: May 2, 2008

(65) Prior Publication Data

US 2008/0281898 A1 Nov. 13, 2008

Related U.S. Application Data

(60) Provisional application No. 60/917,025, filed on May 9, 2007.

(51) Int. Cl.
*G06F 15/16* (2006.01)
(52) U.S. Cl.
USPC ............ 709/203; 709/205; 709/217; 709/219
(58) Field of Classification Search
USPC ......................................... 709/203
See application file for complete search history.

(56) References Cited

U.S. PATENT DOCUMENTS

| | | | | |
|---|---|---|---|---|
| 7,730,082 B2 * | 6/2010 | Sah et al. | ...... | 707/770 |
| 7,730,109 B2 * | 6/2010 | Rohrs et al. | ...... | 707/803 |
| 2005/0050021 A1 * | 3/2005 | Timmons | ...... | 707/3 |
| 2005/0166188 A1 * | 7/2005 | Secrist et al. | ...... | 717/136 |
| 2006/0053029 A1 * | 3/2006 | Butler | ...... | 705/1 |
| 2006/0064422 A1 * | 3/2006 | Arthurs et al. | ...... | 707/10 |
| 2006/0069920 A1 * | 3/2006 | Jolley | ...... | 713/182 |
| 2006/0129935 A1 * | 6/2006 | Deinlein et al. | ...... | 715/733 |
| 2007/0130293 A1 * | 6/2007 | Dong et al. | ...... | 709/219 |
| 2007/0226633 A1 * | 9/2007 | Lyle et al. | ...... | 715/742 |
| 2007/0283251 A1 * | 12/2007 | Pally | ...... | 715/530 |
| 2008/0077851 A1 * | 3/2008 | Hesmer et al. | ...... | 715/234 |

OTHER PUBLICATIONS

"Introduction to JSR 168—The Java Portlet Specification" published by Sun Microsystems in 2003; 19 pages.*

* cited by examiner

*Primary Examiner* — Richard G Keehn
(74) *Attorney, Agent, or Firm* — Fliesler Meyer LLP

(57) ABSTRACT

Provided herein are systems, and methods for use therewith, for creating a portlet that can be inserted into an external web page that is outside a portal framework. A portal product is adapted to create one or more portlets that are made available to consumers by a producer. The portal product automatically assigns a URL to the one or more portlets to be inserted into an external page separate from the portal product.

11 Claims, 5 Drawing Sheets avitek. Employees G<

| Travel Home | Benefits \| Payroll \| Legal \| Phonebook \| Locations |

Travel Policy
Preferred Vendors
Approval Process

New Travel Policy
- Per diem Expense system
- VP approval required
- New receipt requirements

How to Book Online
Explanation of how to book your travel online

Car Damage Waivers
What you need to know about renting a car

Business Class Upgrades
Tips on how to improve your upgrade chances

Customer Locations

Customers in region: New York (adrenaline)

| | Customer ID | Name | Description |
|---|---|---|---|
| | C034 | New Jersey Power and Lights | Utility commission for northern New Jersey |
| | C068 | East Coast Manufacturing | Electrical equipment supplier |
| | C071 | Quaker Foods | Packaged foods |
| | C049 | Keller Insurance | Franchised insurance brokers |

This site is maintained by IT, Last updated July 5, 2006

FIG. 2B

PORTLETS IN NON-PORTAL PAGES

CLAIM OF PRIORITY

This application claims priority from the following co-pending application, which is hereby incorporated in their entirety: U.S. Provisional Patent Application No. 60/917,025 entitled "PORTLETS IN NON-PORTAL PAGES", by Peter Laird, et al., filed on May 9, 2007.

FIELD OF THE INVENTION

The present invention relates to the use of portlets in external web pages.

BACKGROUND

Portlets are described in the JSR 168 specification. Portlets are powerful components for use in portal applications. Portlets can be displayed in a portion of a portal page to expose portlet functionality.

BRIEF DESCRIPTION OF THE FIGURES

FIG. 2A-2B illustrates the use of a portlet in an external web page.

DETAILED DESCRIPTION

Figure 1A:
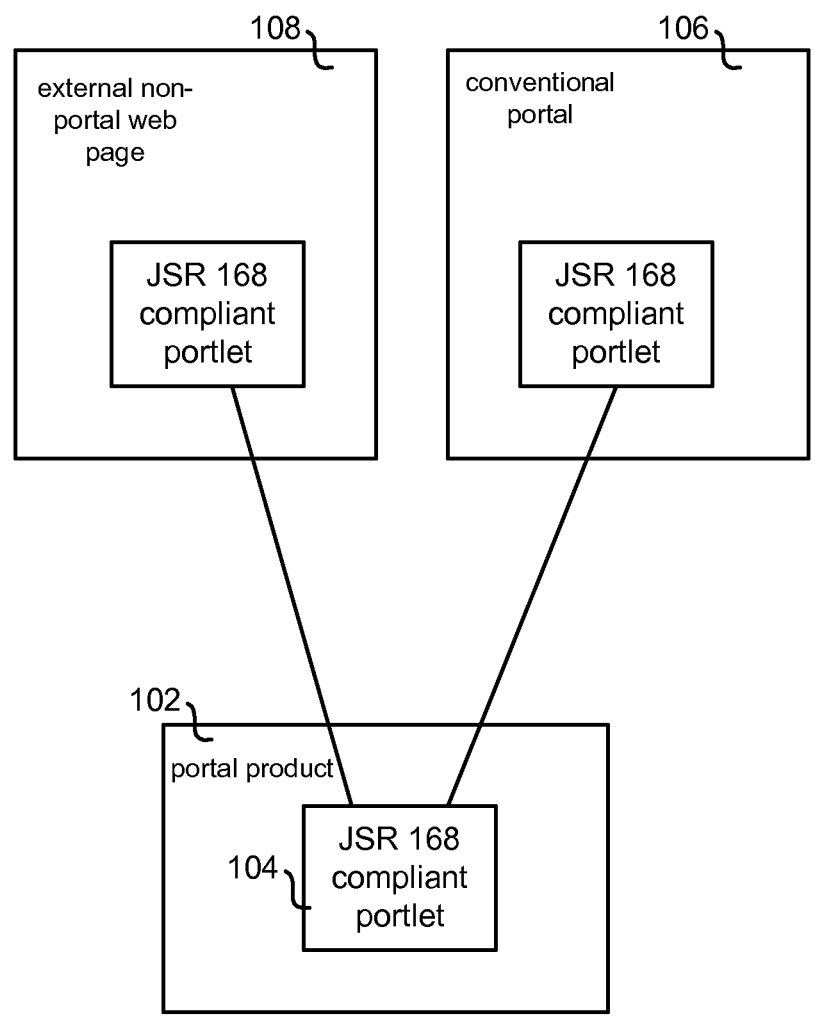
FIG. 1A-1B shows an overview of one portlet system of the present invention.

FIG. 1A shows an example of a portal product 102 for creating portals. The portal product 102 is adapted to create a JSR 168 compliant portlet 104. The JSR 168 compliant portlet 104 can be inserted in a conventional portal 106.

In one embodiment, the portal product 102 can automatically assign a URL to the JSR compliant portlet 104 that allows it to be inserted into an external web page 108 that is not under the control of a portal product 102.

The portlets can have lifecycles including lifecycle methods. The portlets can have portlet modes including view, edit and help. The portlet can have a window state indicating the amount of page space assigned to the portlet.

Figure 1B:
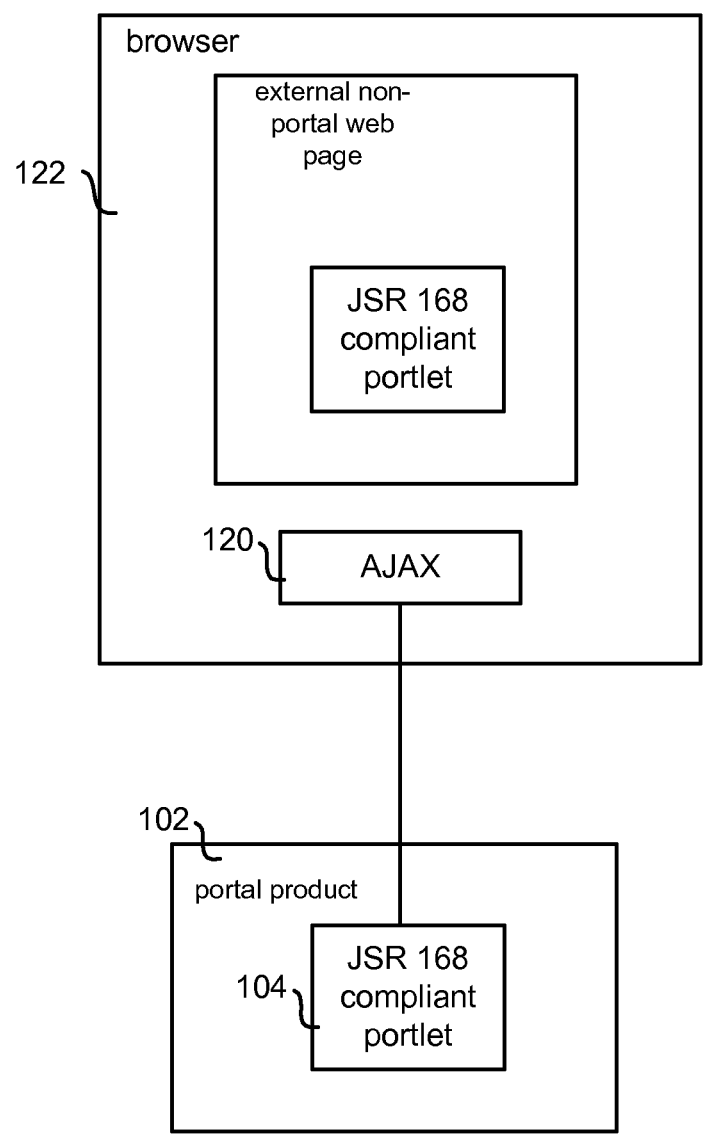

The system can use IFrames, AJAX snippets, or AJAX JSP tags to implement the portlets in a non-portal page. FIG. 1B shows an example that uses AJAX 120 at browser 122 to update a display including the portlet in an asynchronous manner.

In one embodiment, the use of JSR 168 compliant portlets in a non-portal application is called Adrenaline. Portlets have traditionally been confined to portal applications. Traditionally, an application server running a portal container was needed to view them. Adrenaline technology enables portlets to be surfaced in any Web application, without the need for a portal container. In this way, portlets can be exposed from within Struts or Spring application—or any other Web application.

Enterprises with widespread legacy Web applications have a costly task just maintaining the existing investment; adding new functionality is almost out of the question. It is often too risky to send a developer into a legacy application to add features because of the risk of destabilizing the existing code base. These Web applications become frozen in time as they cannot be updated to meet the changing needs of the users. Adrenaline helps in situations such as these; developers simply need to make minor extensions to the Web applications to render portlets.

In addition, many enterprises have adopted portal infrastructures to aid in managing application sprawl. Portals enforce componentized development and offers shared infrastructure such as security and application administration. While moving from custom Web applications to portals is often a goal, the effort can at times seem too costly. Here again, Adrenaline can help by easing the transition from Web applications to portals.

By automatically assigning portlets URLs, portlets can be stand alone user interface components. Adrenaline can provide support for rendering portlets outside of a portal framework. Any team that must support non-portal Web applications can benefit from this feature. Whereas the portlet component model formerly required adoption of a portal architecture throughout the enterprise, portlets can now be employed to surface user interface components in legacy Web applications, in new Web applications, and, of course, in portals.

Portlet containers can provide a component model with many features, while at the same time supporting developers who already have a preferred technology such as Struts, JSF, and Java Pageflows. The portlet development model is a productive and feature-rich environment that enforces the development of user interfaces as portable components. By using Adrenaline, the enterprise can standardize on a consistent approach to Web user interface componentization for maximum reuse and minimum cost.

Additionally, Adrenaline can use Ajax to manage interactions with the portlet without page refreshes. This allows an Adrenaline portlet to be added to a page without the risk of interfering with the existing page logic. Adrenaline essentially operates in isolation on the page.

Figure 2A:
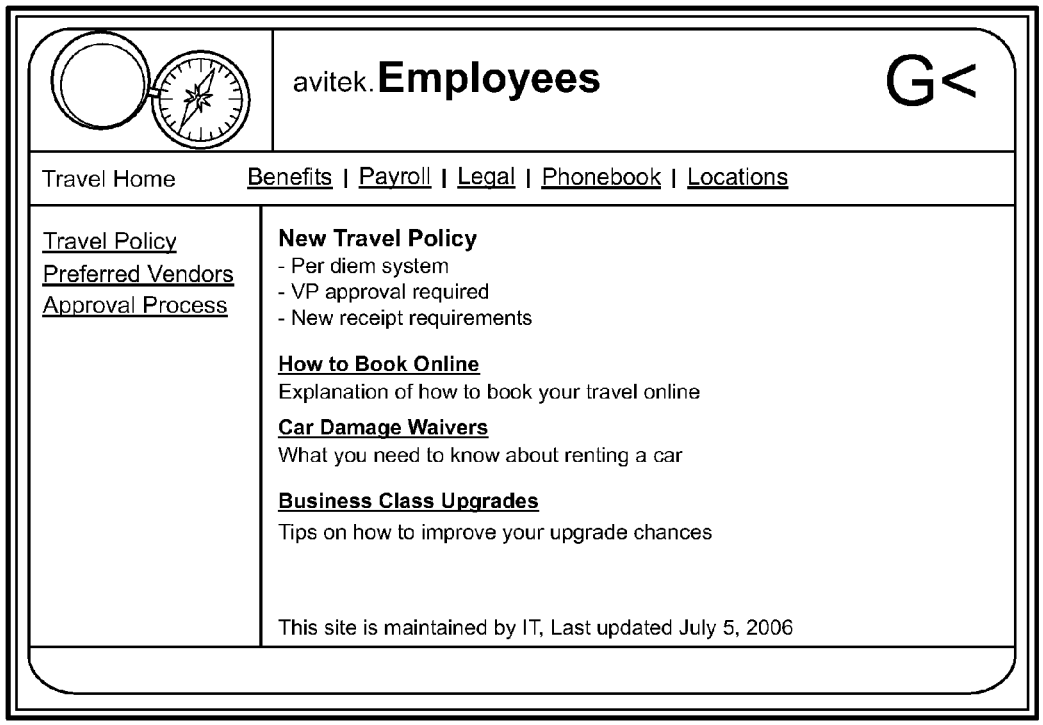

Inserting new features into existing applications is sometimes risky because any change could destabilize the existing code base. Adrenaline offers a compelling solution. By inserting a portlet onto a legacy page, a developer with little knowledge of the application can add features without destabilizing the application. As an example, FIG. 2A shows a stale legacy application rendered from static HTML Web pages.

FIG. 2B shows the same legacy page with a new portlet. The portlet was developed in isolation, and then using a simple technique, the portlet was deployed into the legacy Web application. The portlet developer didn't need to understand the legacy application at all.

The power of using a portlet development model to augment existing Web applications is hard to beat. Not only is it easy to add a portlet to a legacy Web application, that same portlet can be reused in any other Web application. Therefore, the portlet approach allows for simple improvements to legacy applications and it provides for a great reuse model.

Figure 3:
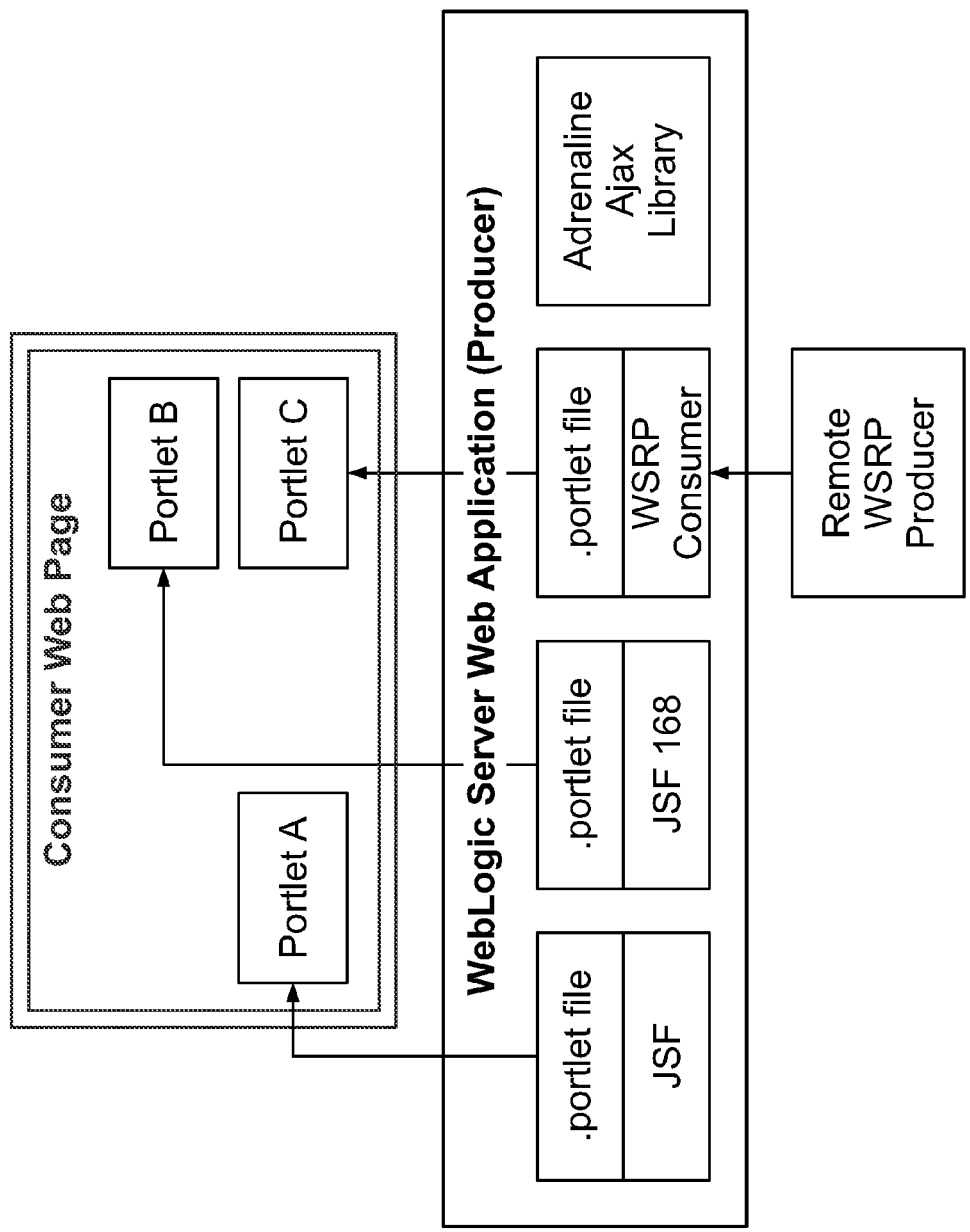
FIG. 3 shows an example of a non-portal web page including multiple portlets.

When surfacing a portlet in a Web application page, it is common to refer to the application that is providing the portlet as the producer. The term consumer then refers to the Web application page that is surfacing that portlet provided by the producer. When using Adrenaline, it is important to see that two applications are at work: the producer and the consumer. In FIG. 3, the Web page is the consumer, and the WebLogic Server Web application is the producer.

In one embodiment, three techniques can be used to make a legacy Web application into a consumer of Adrenaline portlets. Each technique provides a mechanism for inserting a portlet into an existing Web page in a Web application.

IFrame—the most portable technique, the portlet URL is rendered within its own IFrame on the Web page.

Ajax—a more advanced technique, the portlet is asynchronously rendered by the Adrenaline JavaScript library directly into the page text (via the DOM).

Ajax JSP Tag—for WebLogic Server Web applications, a convenient JSP tag can be used.

Using these techniques, Adrenaline portlets can be surfaced in any HTML consumer Web application. This can include NET, Ruby on Rails, PHP, static HTML, and, of course, Java Web applications.

The first step to using Adrenaline is to develop a portlet. Portal products offer numerous options for developing portlets, including using Java Server Faces, Java Pageflows, standard JSP, or a number of other options. This portlet can then be deployed in a Web application supporting Adrenaline, at which point the Web application becomes a producer of the Adrenaline portlet.

Using an IFrame to insert a new feature into a Web page has become a common technique across the Internet. Many mashup sites rely on this approach, for example. The concept is simple: A developer edits an existing page, and then adds an <iframe> tag without disturbing the rest of the page. IFrames render within their own isolated frame, and so they cannot harm the surrounding page. For legacy Web applications that are risky to update, an IFrame can be the right approach.

The IFrame tag is very easy to understand. The developer need only specify the source of the rendered content, and optionally some size and scrolling attributes: <iframe src="http://wlp.bea.com/wlpBEAWeb/portlets/travel/customers/customers.portlet" width="350" height="450" frameborder="0" scrolling="auto"/>

The process of using the IFrame to render an Adrenaline portlet is easy. Follow these steps:

1. Obtain the URL to the portlet. This can be determined by looking into the producer Web application, and creating a URL to the desired portlet file—for example, http://[host]:[port]/[webappContextPath]/[relative path]/[portletName].portlet.
2. Open the consumer Web page in an editor.
3. Insert the <iframe> tag into the page where the portlet should be rendered, using the URL to the portlet as the source. Use the example shown above as a reference.

While using an IFrame to insert a portlet into a page is an effective technique, at times it is desirable to render a portlet inline onto a page. In certain cases, the portlet may wish to use JavaScript to interact with elements of the enclosing page. Also, rendering the portlet inline allows the portlet to consume as much screen area as it needs without the need for scrollbars.

With the Ajax consumer technique, all clicks within the portlet are routed to the producer asynchronously, and the returned HTML is inserted into the page. Therefore, the enclosing page is not refreshed for portlet events, which allows the portlet to operate independently without interfering with the application. Multiple Ajax rendered portlets may be used on the same page as long as each instance is given a unique id attribute.

The following is the snippet to use when rendering an Adrenaline portlet via Ajax. Notice how div tags define containers that control different pieces of the rendered portlet:

```
0 <script type="text/javascript" src="/wlpBEAWeb/framework/features/js/async.js" /> 1
<div id=" cmbrowser" class="bea-portal-window-content-async">
2        <br />
3 </div>
4 <div id=" cmbrowser script"></div>
5 <div id=" cmbrowser load" class="bea-portal-window-content-async-load"
style="position: abs
6      Loading...
7 </div>
8 <div id=" cmbrowser error" class="bea-portal-window-content-async-error"
style="position: a 9 ERROR...
10 </div>
11 <script type="text/javascript">
12
       bea.netuix.ajax.updateContents("_cmbrowser","http://wlp.bea.com/wlpBEAWeb/
portlets/trav
13 </script>
```

The key to the Ajax snippet is the call to bea.netuix.ajax.updateContents( ) function. It is this function that can ultimately render the HTML contents from the portlet into the cmbrowser div tag. The portlet can be accessed via a URL to the .portlet file, which can trigger a servlet to render that portlet. The links and form actions in the rendered HTML can be correctly rewritten to submit through the XMLHttpRequest and in one embodiment, will not cause a page refresh. The JavaScript code that powers Adrenaline can be found within the file async.js, which is referenced at the top of the snippet.

Browsers typically have a security feature that will not allow the portlet to come from a server in a different IP domain than the outer HTML page. Therefore, this approach will work only when the portlet and the Web application are hosted by the same organization.

To use this snippet to surface your portlet in your own Web application, you can follow these steps:
1. Copy the above snippet into an HTML page in your Web application. You will need to remove the preceding line numbers.
2. Search for the text cmbrowser within the snippet, and replace that text with a unique id for your portlet on the page.
3. Obtain the URL to the WebLogic Server Web application in which your Adrenaline portlet is deployed. This will likely be a URL of the form http://[host]:[port]/[webappContextPath]
4. Update the URL in snippet line 0 with the portlet Web application URL, as in /[webappContextPath]/framework/features/js/async.js.
5. Obtain the relative path of the portlet descriptor within the WebLogic Server Web application, as in /[relative path]/[portletName].portlet.
6. Update the URL in snippet line 12 with the portlet Web application URL and the relative path to the portlet, as in http://[host]:[port]/[webappContextPath]/[relative path]/[portletName].portlet?[keep the existing parameters shown above].

Adrenaline offers a JSP tag that may be embedded into any JSP page in a WebLogic Server Web application that has Adrenaline installed. The portlet to which it refers can also be deployed in the same Web application (for a local portlet) or it can be deployed remotely if using WSRP. Ultimately, Adrenaline must have a WebLogic Portal .portlet descriptor in the Web application for the portlet that is to be exposed.

To surface a portlet in a JSP page, the new Adrenaline portalFacet tag can be inserted into the JSP page:

```
<%@taglib uri="http://www.bea.com/servers/portal/tags/netuix/render"
prefix="render"%>
< render:portalFacet label=" customers"
path="/portlets/travel/customers/customers.portlet" />
``` where the Web application has a file called sample portlet deployed in the portlets subdirectory. The label tag attribute must be unique to all portalFacet tags on the page as it identifies the portlet instance. At runtime, the portalFacet tag will render the specified portlet on the page using the Ajax approach that has already been described. You may include multiple portlets on a single page by inserting multiple portalFacet tags with unique label attributes.

Developing portlets on the producer side instead of plain Web applications include:

Components, not pages: most Web applications would not fit well within a portlet-sized IFrame. What are needed are user interface components to consume, not entire pages.

Standard and pervasive: Portlet technology is a standard and pervasive approach to creating componentized Web user interfaces.

Reuse: By deploying a user interface component as a portlet, that same portlet can be exposed as Adrenaline, WSRP, and directly into portals.

Features: Adrenaline portlets have access to numerous portlet container features, such as caching, preferences, look and feels, entitlements, and so on.

Migration: Developing Adrenaline portlets provides an incremental approach for a migration from legacy Web applications to enterprise portals.

When using any of the consumer techniques, it is always possible for the consumer and producer to be in the same Web application. For the portalFacet tag, this is actually required. There is an advantage with deploying in this manner. In this configuration, if a user authenticates with either the consumer Web page or the producer portlet, the authentication is automatically shared. This is due to the fact that the user is operating entirely within the boundaries of a single Web application.

When using the IFrame Consumer or Ajax Consumer techniques, it is common for the consumer and producer to be part of different Web applications. While this is a flexible approach, it is important to understand how this configuration affects authentication. Because the consumer and producer are in different Web applications, by default authentication will not be shared. Therefore, the user can be required to authenticate twice-once with the consumer and once with the producer.

This problem is not unique to Adrenaline. Forcing users to authenticate with many Web applications is commonly seen within the enterprise. To solve this issue, Single Sign-On (SSO) solutions have become widely deployed within the enterprise. SSO solutions commonly use cookies to maintain user identity across Web sites. As long as both consumer and producer are in the same network domain, these SSO solutions will work without issue with Adrenaline.

JSR 168 compliant portlets are defined by the JSR 168 specification. As described by the JSR 168 specification, the JSR 168 compliant portlets include:

The portlet container contract and portlet life cycle management

The definition of window states and portlet modes

Portlet preferences management

User information

Packaging and deployment

Security

JSP tags to aid portlet development

A portlet container can manage JSR 168 portlets. A contract is defined for the container to call methods during a portlet's life cycle. The portlet developer can implement these methods to provide the desired functionality.

The lifecycle methods called directly by the container can be:

Init( ) which is called when the portlet is instantiated by the container. Intended to contain logic that prepares the portlet to serve requests.

Destroy( ) which is called when the container destroys the portlet. Intended to contain logic that cleans up when portlet is no longer needed or the server shuts down.

ProcessAction( ) which is called after the user submits changes to a portlet. Intended to process input from a user action.

Render( ) which is called whenever the portlet is redrawn by the desktop.

In addition to the methods above, which are called directly by the container, a GenericPortlet class is provided that implements the render( ) method and delegates the call to more specific methods to display the portlet based on its mode. Developers can extend Generic Portlet and implement as many of these specialized render methods as are necessary for their portlet. These methods can be:

doView( ) which is called by render( ) when the portlet is in View mode. Intended to contain logic that displays the View page for the portlet.

doEdit( ) which is called by render( ) when the portlet is in Edit mode. Intended to contain logic that displays the edit page for the portlet.

doHelp( ) which is called by render( ) when the portlet is in Help mode. Intended to contain logic that displays the help page for the portlet.

The processAction( ), render( ), and specialized methods called by render( ) accept portlet requests and response objects similar to those passed to the Servlet service( ) method. Using these objects, the portlet class can do the following:

Maintain state and communicate with other portlets, servlets, and JSP's using the portlet session facilities.

Receive user input from forms displayed in the portlet.

Create the content for display by the Portal desktop that is sent back to the client via the response object.

Query portal and portlet state information.

There are two main state items managed by the container for each portlet: portlet mode and window state. This is one of the differences between portlets and servlets.

Each portlet has a current mode, which indicates the function the portlet is performing. As implied by the methods mentioned above, the modes defined in the JSR 168 in The Portlet Specification are View, Edit, and Help. These modes are used by the default render method to decide which lower level display method to call. The mode can also be queried anywhere in the portlet code using the Portlet API to conditionally behave in a manner that is dependent on the current mode.

Window state indicates the amount of portal page space that will be assigned to a portlet. The portlet can use this information to decide how much information to render. The three window states for each portlet are minimized, maximized, or normal.

Portlets are often configured to provide a custom view or behavior for different users. These configurations are represented as a persistent set of name-value pairs and are referred to as portlet preferences. In The Portlet Specification, the portlet container is responsible for retrieving and storing these preferences through the Port letPreferences interface via the getvalues( ) and setValues( ) methods respectively.

Portlets have access to the PortletPreferences object when processing requests, but may only modify preference attributes during a processAction invocation. Prior to the end of the process Action method, the store( ) method must be invoked for changes to be permanent.

To validate preference values, implement the Preferencesvalidator class. During runtime, the store ( ) method invokes the validate method of the validator before writing changes to the data store.

The Portlet Specification provides a mechanism for portlets to access user information—such as name, email, phone, and address-in the portlet application's deployment descriptor, and then access them through an unmodifiable Map object. The Map object can be retrieved through the USER_INFO constant defined in the Request interface.

The Portlet Specification specifies the packaging and deployment of portlets as part of standard Web Application Archive (WAR) files that may contain other web components, such as JSPs and servlets.

In addition to the webi xml deployment descriptor now found in WAR files, there is an additional portlet xml descriptor that defines all portlets and portlet-related configurations. An XML schema included in The Portlet Specification defines the standard elements for portlet configuration stored in the portlet.xml file.

The Portlet Specification includes several features to help developers create secure portlets.

In the portlet deployment descriptor, a flag can be set to restrict the portlet to running only over HTTPS. This is appropriate for portlets that contain confidential information that should be encrypted when sent over the network.

In addition, the Portlet API includes authentication facilities for querying user and rote information. This allows developers to programmatically control security by introducing business logic based on a user's information and role.

A JSP Tag library can be included to help display portlet pages with JSP technology. For example, a custom JSP tag, can automatically declare the portlet request and response objects so they can be used within the JSP Another JSP tag helps construct URL's that refer back to the portlet.

Embodiments of the present invention can include computer-based methods and systems which may be implemented using conventional general purpose or a specialized digital computer(s) or microprocessor(s), programmed according to the teachings of the present disclosure. Appropriate software coding can readily be prepared by programmers based on the teachings of the present disclosure.

Embodiments of the present invention can include a computer readable medium, such as computer readable storage medium. The computer readable storage medium can have stored instructions which can be used to program a computer to perform any of the features present herein. The storage medium can include, but is not limited to, any type of disk including floppy disks, optical discs, DVD, CD-ROMs, micro drive, and magneto-optical disks, ROMs, RAMs, EPROMs, EEPROMs, DRAMs, flash memory or any media or device suitable for storing instructions and/or data. The present invention can include software for controlling both the hardware of a computer, such as general purpose/specialized computer(s) or microprocessor(s), and for enabling them to interact with a human user or other mechanism utilizing the results of the present invention. Such software may include, but is not limited to, device drivers, operating systems, execution environments/containers, and user applications.

Embodiments of the present invention can include providing code for implementing processes of the present invention. The providing can include providing code to a user in any manner. For example, the providing can include transmitting digital signals containing the code to a user; providing the code on a physical media to a user; or any other method of making the code available.

Embodiments of the present invention can include a computer-implemented method for transmitting the code which can be executed at a computer to perform any of the processes of embodiments of the present invention. The transmitting can include transfer through any portion of a network, such as the Internet; through wires, the atmosphere or space; or any other type of transmission. The transmitting can include initiating a transmission of code; or causing the code to pass into any region or country from another region or country. A transmission to a user can include any transmission received by the user in any region or country, regardless of the location from which the transmission is sent.

Embodiments of the present invention can include a signal containing code which can be executed at a computer to perform any of the processes of embodiments of the present invention. The signal can be transmitted through a network, such as the Internet; through wires, the atmosphere or space; or any other type of transmission. The entire signal need not be in transit at the same time. The signal can extend in time over the period of its transfer. The signal is not to be considered as a snapshot of what is currently in transit.

The forgoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. For example, steps preformed in the embodiments of the invention disclosed can be performed in alternate orders, certain steps can be omitted, and additional steps can be added. The embodiments were chosen and described in order to best explain the principles of the invention and its practical application, thereby enabling others skilled in the art to understand the invention for various embodiments and with various modifications that are suited to the particular used contemplated. It is intended that the scope of the invention be defined by the claims and their equivalents.

The invention claimed is:

1. A computer implemented system comprising:
at least one hardware processor and memory;
a portal product operating on said at least one hardware processor and memory, the portal product being adapted to create one or more portlets, and implement lifecycle methods used to implement portlet functionality for each one of the one or more portlets; and
the portal product comprising a producer that provides the one or more portlets created by the portal product to a consumer wherein the producer automatically assigns a portlet URL to each one of the one or more portlets, wherein each portlet has a different portlet URL assigned;

the portal product being adapted to allow the consumer to asynchronously render the one or more portlets made available by the producer, wherein asynchronously rendering a portlet includes detecting, by the consumer, that a portlet URL has been inserted in an external page, wherein the external page is separate from the portal product, rendering, by the consumer, the external page and invoking the portlet URL detected within the external page, asynchronously rendering the portlet associated with the detected portlet URL within the external page, and routing communication between the portlet associated with the detected portlet URL and the producer, wherein the communication from the producer to the portlet is asynchronously inserted into the portlet within external page; and wherein at least one of the lifecycle methods for the portlet associated with the detected portlet URL is activated upon rendering the external page.

2. The computer implemented system of claim 1, wherein the one or more portlets are JSR 168 compliant.

3. The computer implemented system of claim 1, wherein the portlet associated with the detected portlet URL is updated by AJAX at the browser.

4. The computer implemented system of claim 1, wherein functionality of the portlet associated with the detected portlet URL is maintained separate from functionality of the external page.

5. A computer implemented method, said method comprising:

providing a portal product adapted to create one or more portlets, each one of the one or more portlets having lifecycle methods that are used to implement portlet functionality;

providing a producer in the portal product wherein the producer provides the one or more portlets created by the portal product to a consumer, wherein the consumer renders the one or more portlets made available by the producer;

automatically assigning, by the portal product, a portlet URL to each one of the one or more portlets, wherein each portlet has a different portlet URL assigned;

detecting, by the consumer, that a portlet URL assigned to portlet has been inserted in an external page, wherein the external page is separate from the portal product;

rendering, by the consumer, the external page and invoking the portlet URL detected within the external page;

asynchronously rendering the portlet associated with the detected portlet URL within the external page;

routing communication between the portlet associated with the detected portlet URL and the producer, wherein the communication from the producer to the portlet is asynchronously inserted into the portlet within the external page; and wherein at least one of the lifecycle methods for the portlet associated with the detected portlet URL is activated upon rendering the external page.

6. The computer implemented method of claim 5, wherein the one or more portlets are JSR 168 compliant.

7. The computer implemented method of claim 5, wherein the portlet associated with the detected portlet URL is updated by AJAX at the browser.

8. The computer implemented method of claim 5, wherein functionality of the portlet associated with the detected portlet URL is maintained separate from functionality of the external page.

9. A non-transitory computer readable storage medium storing one or more sequences of instructions, wherein said instructions, when executed by one or more processors, cause the one or more processors to execute the steps of:

providing a portal product adapted to create one or more portlets, each one of the one or more portlets having lifecycle methods that are used to implement portlet functionality;

providing a producer in the portal product wherein the producer provides the one or more portlets created by the portal product to a consumer, wherein the consumer renders the one or more portlets made available by the producer;

automatically assigning, by the portal product, a portlet URL to each one of the one or more portlets, wherein each portlet has a different portlet URL assigned;

detecting, by the consumer, that a portlet URL assigned to portlet has been inserted in an external page, wherein the external page is separate from the portal product;

rendering, by the consumer, the external page and invoking the portlet URL detected within the external page;

asynchronously rendering the portlet associated with the detected portlet URL within the external page;

routing communication between the portlet associated with the detected portlet URL and the producer, wherein the communication from the producer to the portlet is asynchronously inserted into the portlet within the external page; and wherein at least one of the lifecycle methods for the portlet associated with the detected portlet URL is activated upon rendering the external page.

10. The non-transitory computer readable storage medium of claim 9, wherein the portlet associated with the detected portlet URL is updated by AJAX at the browser.

11. The non-transitory computer readable storage medium of claim 9, wherein functionality of the portlet associated with the detected portlet URL is maintained separate from functionality of the external page.

* * * * *